United States Patent [19]
Terry et al.

[11] Patent Number: 5,988,665
[45] Date of Patent: Nov. 23, 1999

[54] FIFTH WHEEL LOCKING MECHANISM

[75] Inventors: Jeff M. Terry, Birmingham; Linsey E. Brown, Odenville; Howard Thomas Moulton, Birmingham, all of Ala.

[73] Assignee: Fontaine Fifth Wheel Co., Birmingham, Ala.

[21] Appl. No.: 08/879,713

[22] Filed: Jun. 20, 1997

Related U.S. Application Data

[63] Continuation-in-part of application No. 08/441,572, May 15, 1995, Pat. No. 5,641,174.

[51] Int. Cl.⁶ .................................................... B62D 53/12
[52] U.S. Cl. ............................................................. 280/434
[58] Field of Search .................................... 280/434, 433, 280/435, 436, 437

[56] References Cited

U.S. PATENT DOCUMENTS

| | | | |
|---|---|---|---|
| 2,726,878 | 12/1955 | Fontaine | 280/434 |
| 3,171,672 | 3/1965 | Dalton | 280/434 |
| 3,224,788 | 12/1965 | Steinway | 280/434 |
| 3,318,616 | 5/1967 | Fontaine et al. | 280/434 |
| 3,630,545 | 12/1971 | Fontaine et al. | 280/434 |
| 3,844,584 | 10/1974 | Fontaine | 280/434 |
| 4,140,328 | 2/1979 | Fontaine | 280/434 |
| 4,477,100 | 10/1984 | Elyakim | 280/434 |
| 4,946,183 | 8/1990 | Benson et al. | 280/434 |

*Primary Examiner*—Kevin Hurley
*Attorney, Agent, or Firm*—Robert J. Veal; Kenneth M. Bush; Veal & Bush, LLC

[57] ABSTRACT

A novel interconnection of the jaw, wedge and operating handle in a fifth wheel facilitates the provision of a secondary locking mechanism which further insures the security of the system. In the invention, the jaw is connected to the operating handle by a pivoting timing lever which pivots off a pin on the jaw such that the jaw remains engaged with the fifth wheel until the wedge is substantially removed from engagement with the jaw. In cooperation with the primary locking mechanism, a secondary lock is provided at the end of the operating handle such that a pin arrangement engages a stop on the fifth wheel assembly until positively released by the operator.

8 Claims, 6 Drawing Sheets

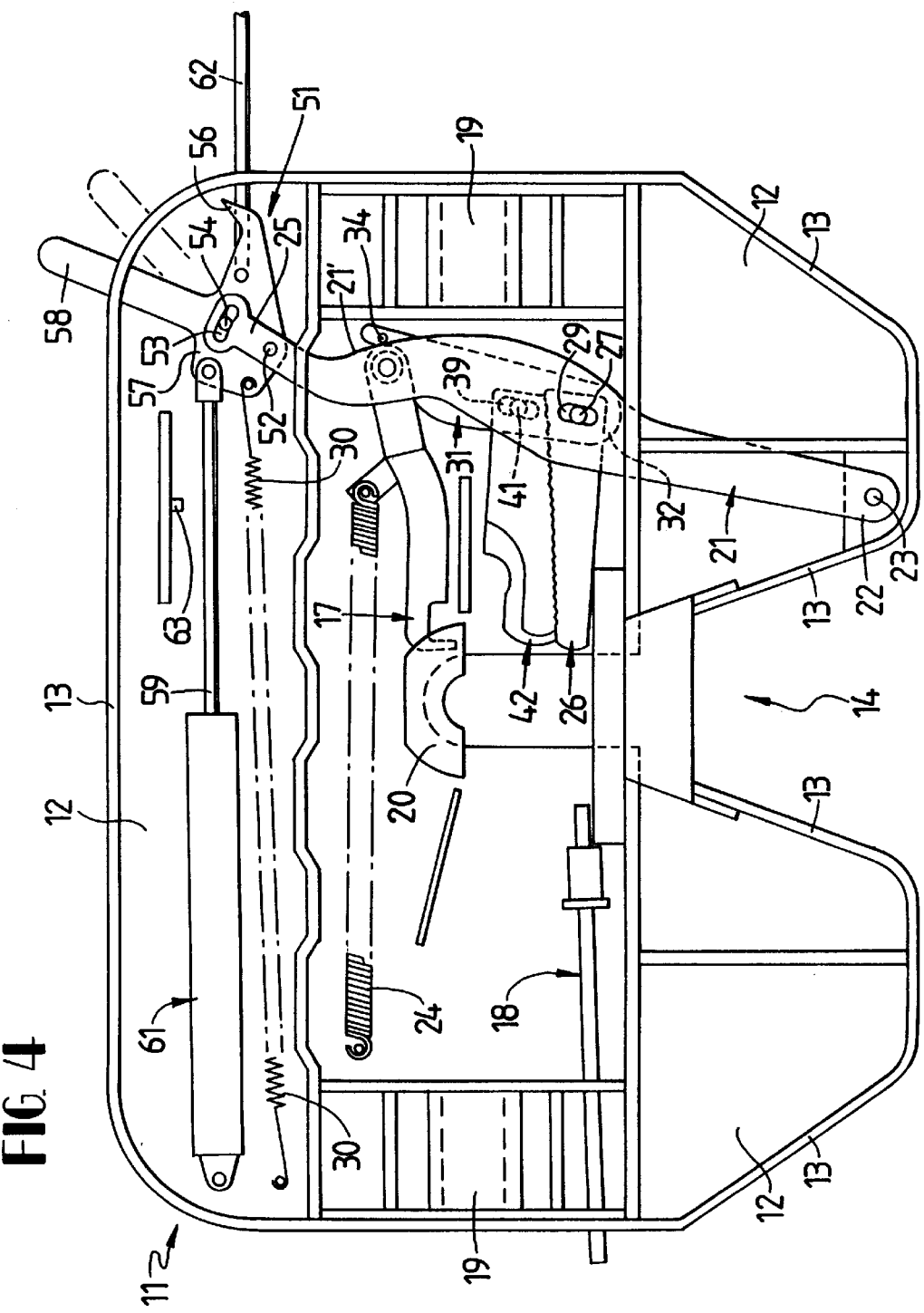

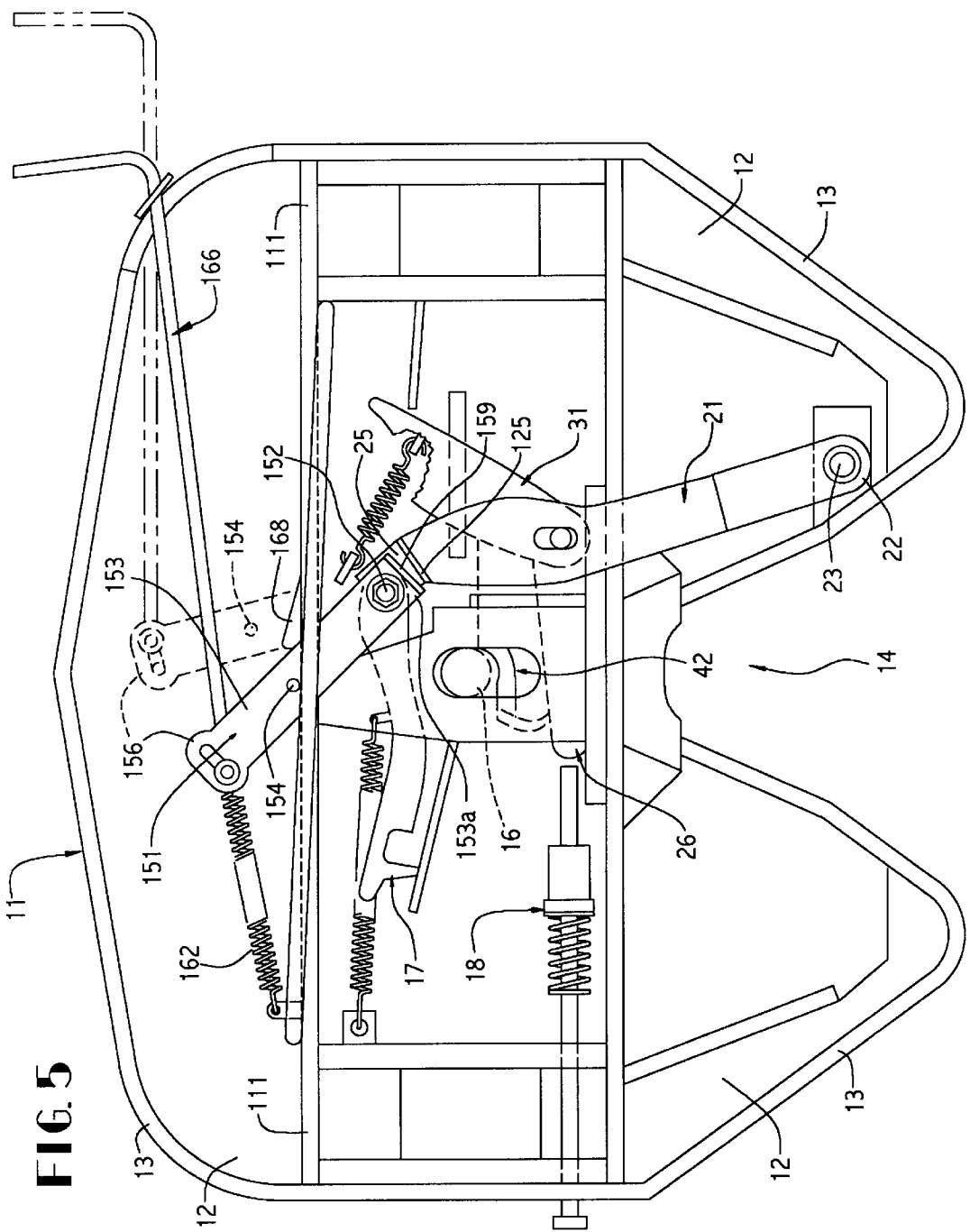

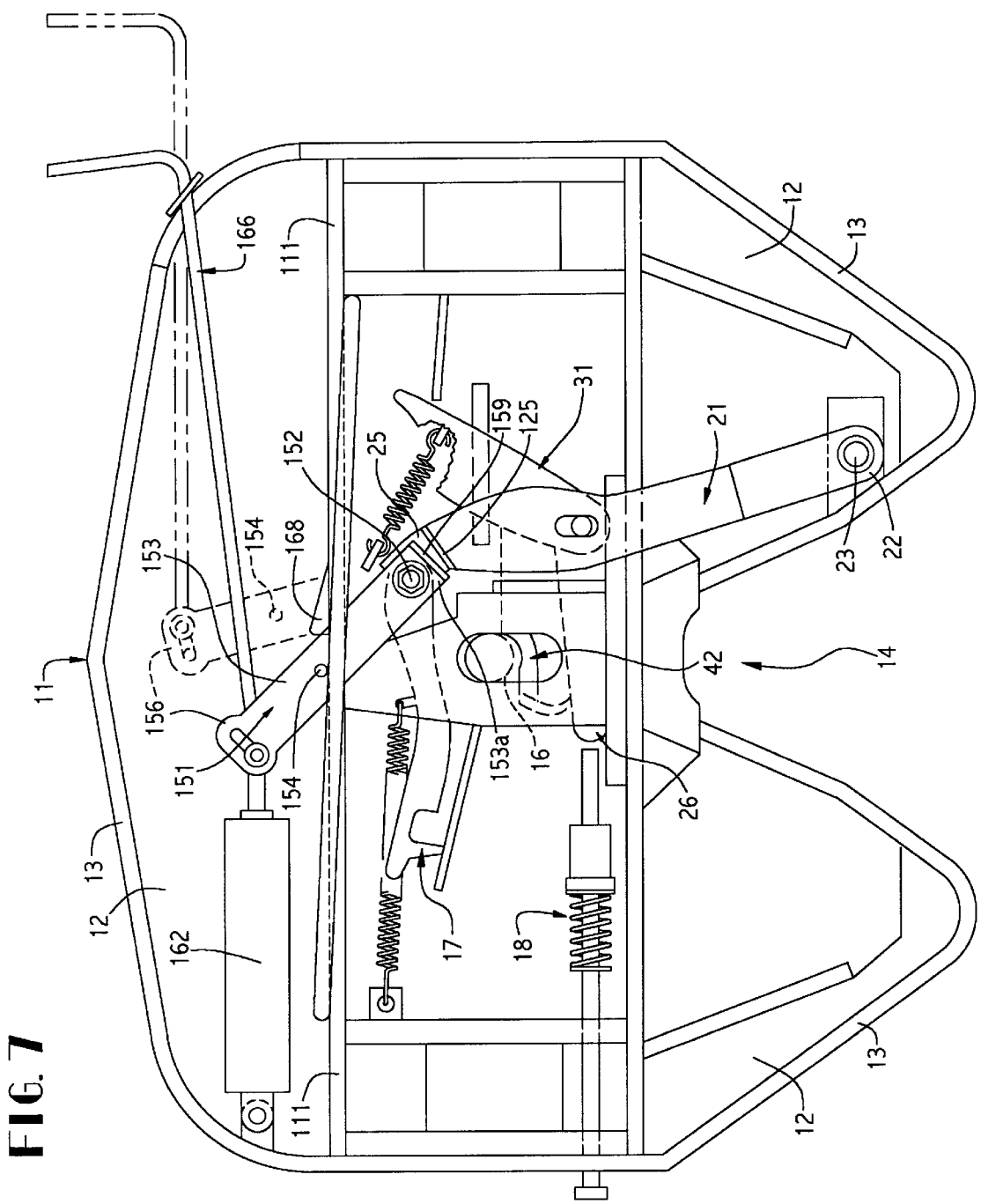

FIFTH WHEEL LOCKING MECHANISM

This is a continuation in a part of Ser. No. 08/441,572, filed May 15, 1995, now U.S. Pat. No. 5,641,174.

FIELD OF THE INVENTION

The present invention relates to the field of vehicles and apparatus for connecting carriages to be towed by vehicles. More particularly, the present invention relates to the class of connections generally known as fifth wheels, wherein a locking assembly on a towing vehicle engages a kingpin on a towed carriage for secure connection of the two while allowing pivotal motion about the axis of the kingpin. In even greater particularity, the present invention relates to improvements in the locking mechanism employed by such fifth wheel apparatus.

BACKGROUND

The prior art is replete with variations on fifth wheel assemblies for coupling a towed trailer to a towing tractor. The variety of units share a locking assembly carried by the tractor to engage a depending king pin carried by the trailer. The locking assembly relied on in the past has included a resiliently loaded jaw member which closes about the king pin to secure it against a fixed seat in the fifth wheel. In some instances, a wedge has been used to hold the jaw in cooperative locking relationship. Resilient members have been biased to urge the components into cooperative relationship. When the king pin is to be released from the fifth wheel, it is sometimes necessary to apply extraordinary force to disengage the components. Even when the components are not "frozen" by accumulated grit or excessive force applied in locking the apparatus, in excess of 120 pounds of force is often necessary to open the fifth wheel, therefore, a degree of physical prowess is required to operate the device. Exemplary of the prior art in this field are the following U.S. Pat. Nos. 2,371,750; 3,318,616; 3,630,545; 3,844,854; and, 4,140,328.

Despite the numerous patents on fifth wheel technology, there remains a need for a fifth wheel which securely locks the kingpin such that "squirting", i.e. inadvertent disengagement, is avoided, yet which can be opened without excessive force.

SUMMARY OF THE INVENTION

It is the object of the present invention to improve the locking mechanism in a fifth wheel to provide improved holding strength while reducing the amount of force needed to intentionally open the lock.

Another object of the invention is to provide a locking mechanism which can be manually or air operated.

Still another object of the invention is to provide a fifth wheel which does not require torsion springs.

These and other objects and features of the invention are accomplished in our invention through the novel interconnection of the jaw, wedge and operating handle in the fifth wheel. In the invention, the wedge is connected to the operating handle by a pivoting timing lever which pivots off a pin on the jaw such that the jaw remains engaged with the fifth wheel until the wedge is substantially removed from engagement with the wedge. In cooperation with the primary locking mechanism, a secondary lock is provided at the end of the operating handle such that a pawl arrangement engages a stop on the fifth wheel assembly until positively released by the operator.

BRIEF DESCRIPTION OF THE DRAWINGS

Apparatus embodying features of the present invention are depicted in the accompanying drawings, which form a portion of this disclosure and wherein:

FIG. 4 is a bottom view of a fifth wheel showing the locking mechanism in the open position;

FIG. 5 is a plan view of a fifth wheel with an alternate embodiment of the pawl lock in the closed position; and, FIG. 6 is a plan view of a fifth wheel with the alternate embodiment in the open position.

DESCRIPTION OF THE PREFERRED EMBODIMENT

Figure 1:
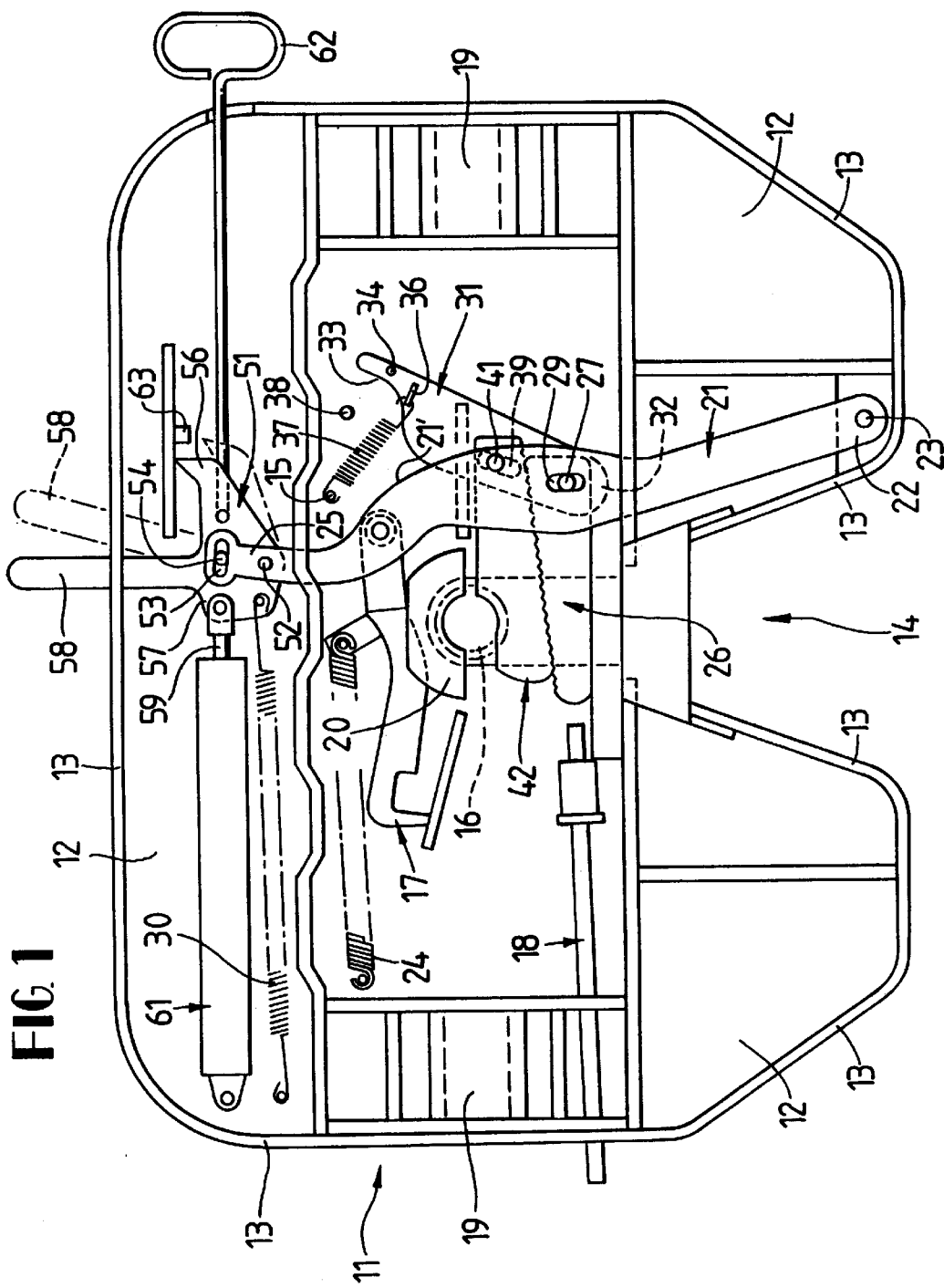
FIG. 1 is a bottom view of a fifth wheel embodying features of my invention, with the locking mechanism in the closed position.
Figure 3:
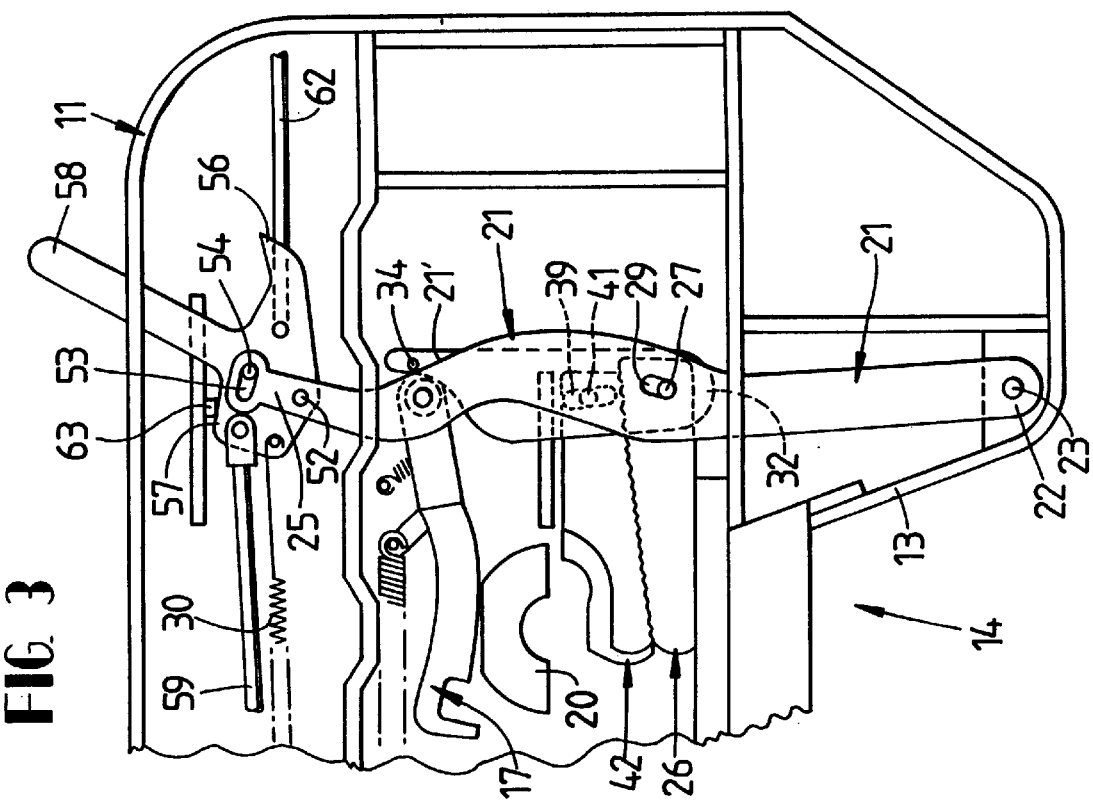
FIG. 3 is another partial bottom view showing the locking mechanism being opened.

Referring to the drawings for a more complete understanding of the invention, it may be seen that our invention resides in a locking mechanism for a fifth wheel. In the description the fifth wheel or fifth wheel assembly 11 will refer to the top plate 12 and a peripheral flange 13, which are generally formed to define a receiving throat 14 in which a kingpin 16 depending from a trailer. Fifth wheel assembly 11 further includes the gussets and flanges necessary to give strength and support to the top plate and peripheral flange, and includes the bumper sub-assembly 17 and the knock-out sub-assembly 18, as well as the mounting means for mounting the fifth wheel to the tractor. The locking mechanism which constitutes the improvement to the fifth wheel art is cooperatively mounted to the fifth wheel assembly 11.

As may be seen in FIG. 1, an operating handle 21 has a first end 22 pivotally mounted to fifth wheel assembly 11 proximal throat 14 at pivot axis 23 by means of a conventional bolt, spacers, and fasteners. Operating handle 21 is an elongated operating handle member extending past the throat 14 and operatively connected to the bumper sub assembly 17 for concomitant motion therewith relative to pivot axis 23. Bumper sub-assembly 17 is pivotally mounted to operating handle 21 and supported conventionally in the fifth wheel assembly 11. A coil spring 24 biases the bumper assembly toward a closed position relative to the throat 14. Operating handle 21 is also connected to a wedge member 26 by a pin 27, which may be formed on the wedge member 26 or inserted therein. Pin 27 is received in a slot 29 formed in operating handle at an angle offset from the longitudinal axis of the operating handle 21 to allow the wedge 24 to move in a straight line as the operating handle 21 pivots in an arc about axis 23. A timing lever 31 has a first end 32 mounted to pin 27 such that the timing lever 31 may pivot about the pin 27 as the wedge 26 moves linearly. Timing lever 31 has a second end which has a camming surface 33 formed thereon and a follower pin 34 extending therefrom. It should be noted that the operating handle 21, wedge 24, and timing lever 31 are all generally plate like members and are in stacked relation to one another about their common connection at pin 27. Follower pin 34 extends from timing lever 31 in the direction of operating handle 21 and is designed for cooperative engagement with an edge 21' thereof during the operation of the locking mechanism.

Extending from timing lever 31 on the opposite side thereof is a spring bracket 36 which is connected to one end of an extension spring 37. Spring 37 is secured at its other end to fifth wheel assembly 11 at a bracket 15, such that the timing lever 31 is biased for pivotal rotation about pin 27 toward throat 14. A camming pin 38 is mounted to fifth wheel assembly 11 intermediate bracket 15 and the camming surface 33 on timing lever 31. Timing lever 31 also has formed therein an elongated slot 39 which is spaced from and extends radially from pin 27. Slot 39 receives therein a pivot pin 41 which extends from a jaw member 42. Jaw member 42 is cooperatively positioned with wedge member 26 in accordance with the known operation of fifth wheels such that when a king pin is received in throat 14, wedge member 26 abuts and urges the jaw member into locked engagement therewith to lock the kingpin against fixed jaw 15. Jaw member 42 is connected to operating handle 21 only through pin 41, timing lever 31, and pin 27. Extension spring 37 biases timing lever toward the throat such that the lever 31 is urged about pin 21 against pin 41 as seen in FIG. 1.

Operating handle 21 has a second end 25 which carries a locking and indicator assembly 51. Assembly 51 is pivotally connected to end 25 by a pin 52 for pivotal motion in a plane substantially parallel to the plane of motion of operating handle 21. End 25 has a transverse arcuate slot 53 formed therein, which receives a stabilizing pin 54 extending from assembly 51. Assembly 51 is essentially a plate having a pawl 56 extending from and forming one margin thereof and a dog 57 extending from and forming an opposite margin with pin 54 intermediate the margins. Also intermediate pawl 56 and dog 57 and extending radially away from pin 54 is an indicating vane 58 which extends beyond the peripheral flange of assembly 11. Dog 57 is connected by a pin and clevis or other suitable connection to an end of a rod 59 of a linear actuator 61 mounted to fifth wheel assembly 11 and connected to a remote source of fluid for selective activation. In some instances actuator 61 may be replaced with an extension spring or may have an internal return spring such that retraction of rod 59 urges assembly 51 about pin 54 toward dog 57.

Pawl 56 is pivotally connected to a pull handle 62which extends beyond the fifth wheel assembly 11 as is commonly known, however, the pawl 56 and handle 62 are biased inwardly by actuator 61 such that pawl 56 is seated behind a stop 63 formed on the fifth wheel assembly 11. Accordingly, it may be seen in FIG. 1 that rotation of operating handle 21 about the pivot axis 23 due to an attempt of the wedge 26 to squirt, will result in pawl 56 abutting against stop 63. Therefore, it may be seen that the operating handle 21 can only be moved to the open position shown in FIG. 4 after assembly 51 has been pivoted by actuator 61 or handle 62 to move pawl 56 such that it will not engage stop 63.

Figure 2:
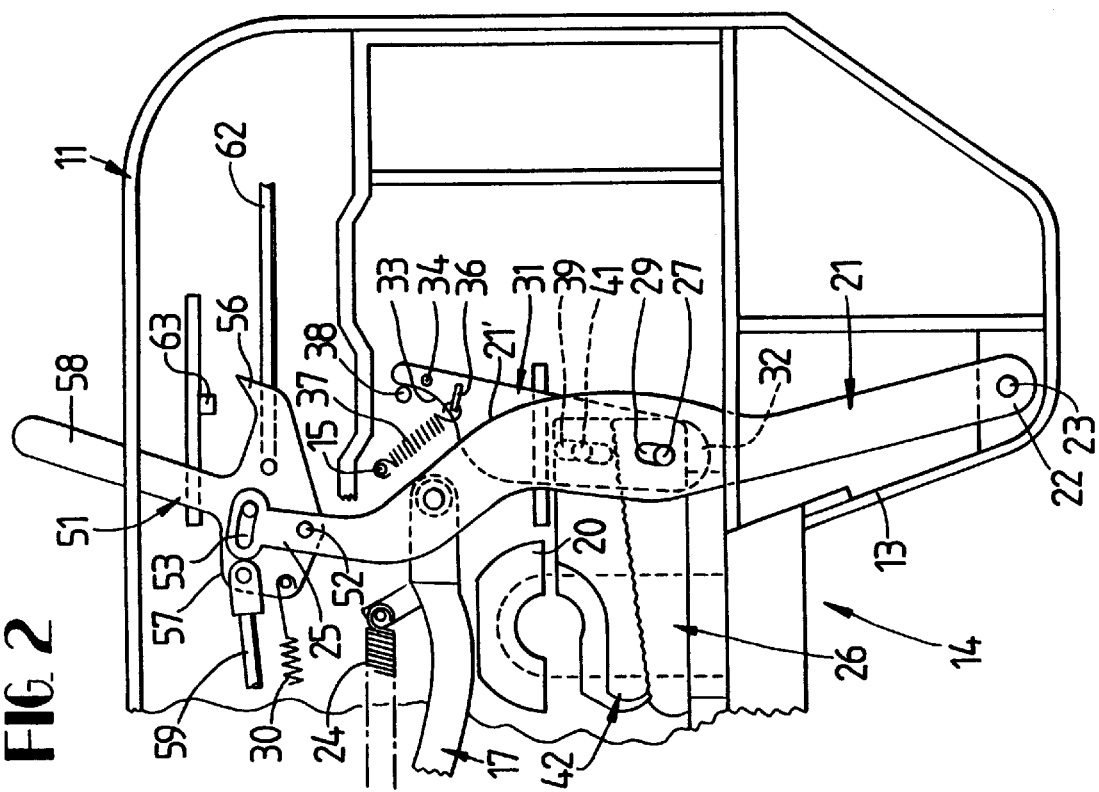
FIG. 2 is a partial bottom view of a fifth wheel with the locking mechanism moved toward an open position.

The operation of the mechanism can be understood by considering the drawings. In FIG. 1, the wedge 26 and jaw 42 are in the closed locked position and operating handle 21 is in its proper closed position. Assembly 51 is rotated to the closed position by the retracted rod 59. With reference to FIG. 2, either actuator 61 or handle 62 has been used to apply force to assembly 51 to rotate it toward pawl 56, thereby moving the pawl to clear stop 63. Further force on the assembly begins moving the operating handle 21 about pivot axis 23, causing wedge 26 to move linearly away from its locking position. As wedge 26 moves, extension spring 37 urges the second end of timing lever 31 toward camming pin 38 until camming surface 33 abuts the pin 38.

As operating handle continues to move to the open position wedge 26 and pin 27 move concomitantly, carrying the first end of lever 31 outwardly and now pivoting the lever 31 on camming pin 38 causing jaw 42 to begin disengaging the kingpin 16, until side 21' of the operating handle engages follower pin 34 to carry the lever wedge and jaw to the fully open position of FIG. 4. It will be understood that the bumper assembly 17 moves and operates in the conventional manner. It should also be noted that the displacement of the wedge from the locked position is greater than in the prior art devices, thus insuring less likelihood of damage, yet requiring less force to open.

Figure 6:
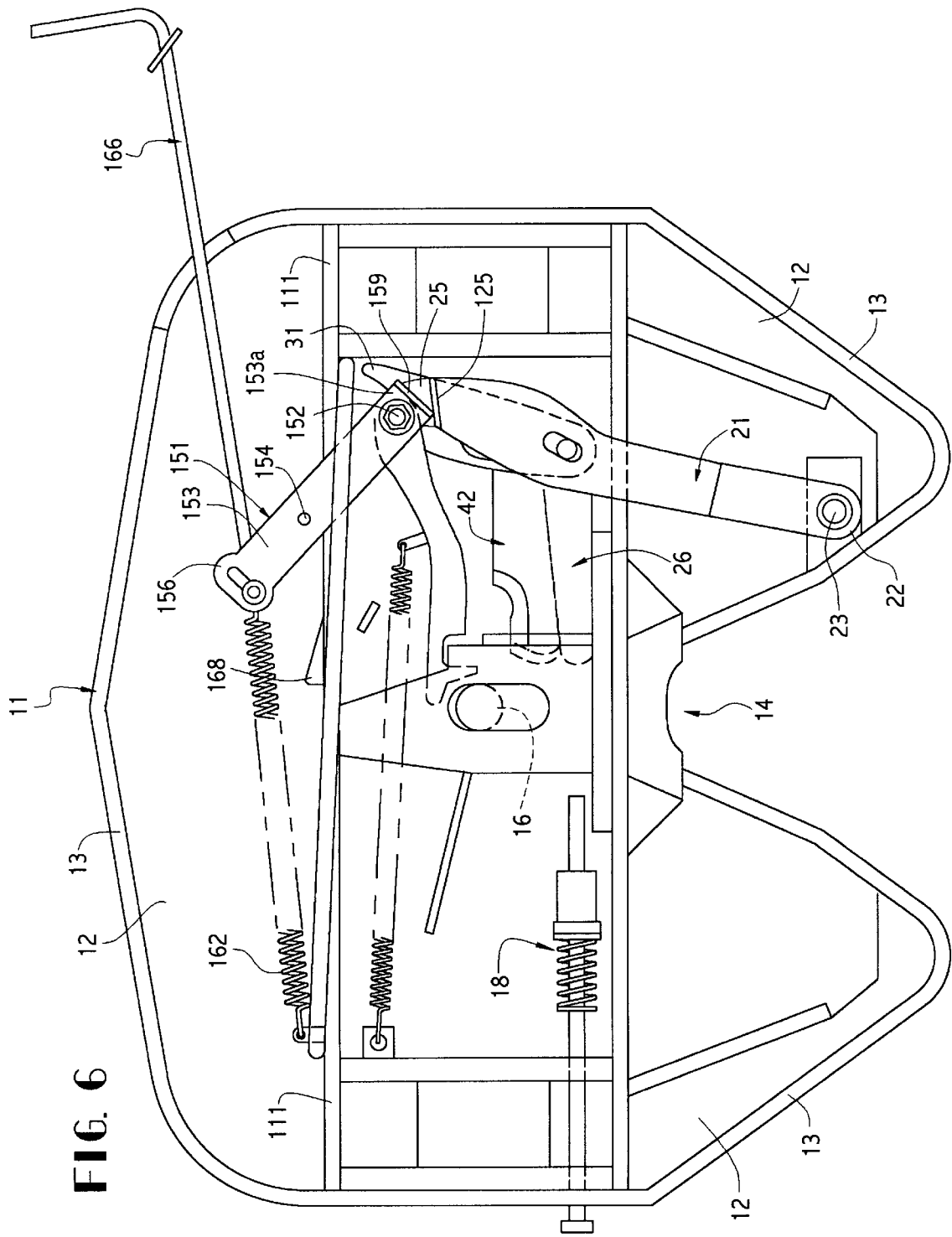

An alternative embodiment is shown in FIGS. 5 and 6. Operating handle 21 at second end 25 carries a locking extension 151. Extension 151 is pivotally connected to end 25 by a pin 152 for pivotal motion in a plane substantially parallel to the plane of motion of operating handle 21. End 25 has a transverse flange 125 extending normal to the plane of motion adjacent extension 151. Extension 151 is essentially a bar like plate 153 pivotally mounted a first end 153a by pin 152 and having a free end 156. A locking pin 154 extends perpendicularly from plate 153. Fifth Wheel assembly 11 has a transverse gusset 111 formed thereon with a stop 168 formed thereon and extending parallel to the plane of rotation. Locking pin 154 is positioned on plate 153 and extends therefrom such that it abuts gusset 111. Free end 156 is connected by a pin and clevis or other suitable connection to an end of a spring 162 or a linear actuator mounted to fifth wheel assembly 11 and having an internal return spring such that the spring urges extension 151 about pin 152 toward gusset 111.

Free end 156 is also pivotally connected to a pull handle 166 which extends beyond the fifth wheel assembly 11 as is commonly known, however, the free end 156 and handle 166 are biased inwardly by spring 162 such that pin 154 is seated behind stop 168 formed on the fifth wheel gusset 111. Accordingly, it may be seen in FIG. 5 that rotation of operating handle 21 about the pivot axis 23 due to an attempt of the wedge 26 to squirt, will result in pin 154 abutting against stop 168. Therefore, it may be seen that the operating handle 21 can only be moved to the open position shown in FIG. 6 after extension 151 has been pivoted by handle 166 to move pin 154 such that it will not engage stop 168. That is to say, pin 154 is located at a distance from pin 152 such that rotation of plate 153 about pin 152 by handle 166 carries the pin over and past stop 168. Continued rotation of plate 153 brings a transverse flange 159 into abutment with flange 125 such that further movement of rod 166 urges operating handle 21 toward the open position with the results as described hereinabove to release the king pin.

When the king pin is released and the tractor is to be displaced from the trailer, it will be appreciated that spring 162 will urge free end 156 toward stop 168 thereby partially retracting handle 166 and thereby diminishing any interference between the handle and the truck frame or tires. When a king pin is subsequently engaged spring 162 urges the pin to the locked position relative to stop 168.

While we have shown our invention in one form, it will be obvious to those skilled in the art that it is not so limited but is susceptible of various changes and modifications without departing from the spirit thereof.

What we claim is:

1. In a fifth wheel having a fabricated body including a fixed jaw, a movable jaw, a wedge for holding said jaw against a kingpin of a trailer when said kingpin is abutting a seat formed in said fifth wheel, and an operating handle pivotally mounted at a first end to said body for moving said wedge to a disengaged position to release said kingpin, the improvement comprising:

a. a locking extension mounted on a free end of said operating handle for selective pivotal movement in a plane parallel to said operating handle, said operating handle having a flange thereon for limiting the pivotal movement of said locking extension;

b. means for biasing said locking extension about said free end away from said flange;

c. means extending from said locking extension for engaging said body at a cooperative means formed thereon for arresting linear motion of said locking extension in a first direction; and, d. a pull handle extending from said body and operably connected to said locking extension for urging said locking extension pivotally toward said stop, whereby said means for engaging and said means for arresting are disengaged with said locking extension transferring force from said pull handle through said stop to said operating handle to move said wedge to a disengaged position.

2. The improvement as defined in claim 1 wherein said locking extension comprises a bar having a first end mounted to said operating handle and having a cooperative flange formed thereon for abutting said flange at a predetermined angular position and having a second end connected to said pull handle.

3. The improvement as defined in claim 2 wherein said bar has a transverse slot formed therein at said second end and wherein said pull handle is connected thereto by a slot.

4. The improvement as defined in claim 2 wherein said biasing means is connected to said bar at said second end such that said bar and said pull handle are urged away from said flange when said operating handle is in the disengaged position.

5. The improvement as defined in claim 2 wherein said means for engaging comprises a pin extending from said bar towards said body and wherein said means for arresting comprises a shoulder formed on a linear gusset of said body, said pin being cooperatively positioned to abut said gusset proximal said shoulder.

6. The improvement as defined in claim 5 wherein said shoulder includes a first surface orthogonal to the longitudinal dimension of said pin and said linear gusset, said first surface extending a distance from said gusset to prevent sliding movement of said pin along said gusset in a first direction, and a second surface extending from said first surface toward said linear gusset to allow sliding movement of said pin thereover in a direction opposite said first direction.

7. The improvement as defined in claim 6 wherein said biasing means comprises a tension spring.

8. The improvement as defined in claim 3 wherein said biasing means comprises a pneumatic linear actuator operatively connected at said slot and to said body, such that extension of said actuator pivots said locking extension into engagement with said flange and retraction of said actuator biases said locking extension away from said flange.

* * * * *